(12) United States Patent
Saito (10) Patent No.: US 8,020,470 B2
(45) Date of Patent: Sep. 20, 2011

(54) HARMONIC GEAR DRIVE

(75) Inventor: Yasuji Saito, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 426 days.

(21) Appl. No.: 11/798,468

(22) Filed: May 14, 2007

(65) Prior Publication Data

US 2007/0261516 A1    Nov. 15, 2007

(30) Foreign Application Priority Data

May 12, 2006  (JP) .................................. 2006-134001

(51) Int. Cl.
*F16H 33/00* (2006.01)
(52) U.S. Cl. .......................................................... 74/640
(58) Field of Classification Search ...................... 74/640
See application file for complete search history.

(56) References Cited

U.S. PATENT DOCUMENTS

| | | | | |
|---|---|---|---|---|
| 3,187,605 A | * | 6/1965 | Stiff | 74/640 |
| 3,424,432 A | * | 1/1969 | Humphreys | 415/70 |
| 3,747,434 A | * | 7/1973 | Stahlhuth | 74/640 |
| 4,044,274 A | * | 8/1977 | Ohm | 310/83 |
| 4,909,098 A | * | 3/1990 | Kiryu | 74/640 |
| 6,647,827 B2 | * | 11/2003 | Kobayashi | 74/640 |
| 6,799,489 B2 | * | 10/2004 | Ishikawa | 74/640 |
| 6,912,930 B2 | * | 7/2005 | Wang et al. | 74/640 |

FOREIGN PATENT DOCUMENTS

| | | |
|---|---|---|
| JP | 45-000252 | 1/1970 |
| JP | 60-185747 | 12/1985 |
| JP | 10-110790 | 4/1998 |

OTHER PUBLICATIONS

Japanese Office Action dated May 23, 2011, corresponding to Japanese Application No. 2006-134001.

* cited by examiner

*Primary Examiner* — Ha D. Ho (74) *Attorney, Agent, or Firm* — Squire, Sanders & Dempsey (US) LLP (57) ABSTRACT

A harmonic gear drive includes a flexspline and a rigid spline which are meshed with each other, and a wave generator which deforms the flexspline to displace meshing points between the flexspline and the rigid spline. The length of each contact part between the flexspline and the wave generator always becomes shorter as viewed in a sectional plane containing a rotation axis of the wave generator than the width of the wave generator.

1 Claim, 9 Drawing Sheets

HARMONIC GEAR DRIVE

CROSS REFERENCE TO RELATED APPLICATIONS

This application claims the foreign priority benefit under Title 35, U.S. Code, §119(a)-(d) of Japanese Patent Application No. 2006-134001 filed on May 12, 2006 in the Japan Patent Office, the disclosure of which is herein incorporated by reference in its entirety.

BACKGROUND OF THE INVENTION

The present invention relates to a harmonic gear drive, which is compact in size and light-weighted, and which can realize high positional accuracy and high gear reduction ratios. More particularly, the present invention relates to a harmonic gear drive, which is suitable for applications in the field of automated machinery such as an articulation driving portion for a robot where silence and smoothness of driving are required, a semiconductor manufacturing device, and reduction gears for a precision actuator, and in the field of aerospace technology such as a control mechanism and a driving mechanism for aerospace machines.

Harmonic gear drive is a mechanical reduction gear device for the transmission of power, which is light and compact and can realize high positional accuracy and high gear reduction ratios without employing any complicated mechanism and structure and with free of backlash. The harmonic gear drive is generally known as a mechanical reduction gear device including a flexspline (flexible gear).

Typically, the conventional harmonic gear drive consists of a rigid circular outer spline with internal teeth, a flexspline with external teeth partly meshed with the internal teeth of the circular spline in a flexible meshing manner, and a wave generator for displacing the meshing points of those internal teeth and external teeth in the circumferential direction for the different number of teeth by means of elastic flexibility. This type of conventional harmonic gear drive is disclosed, for example, in Japanese Laid-open Patent Application No. 10-110790 (paragraphs [0002] to [0003]; FIGS. 1 and 2), which is also referred to as Patent reference 1.

Figure 8:
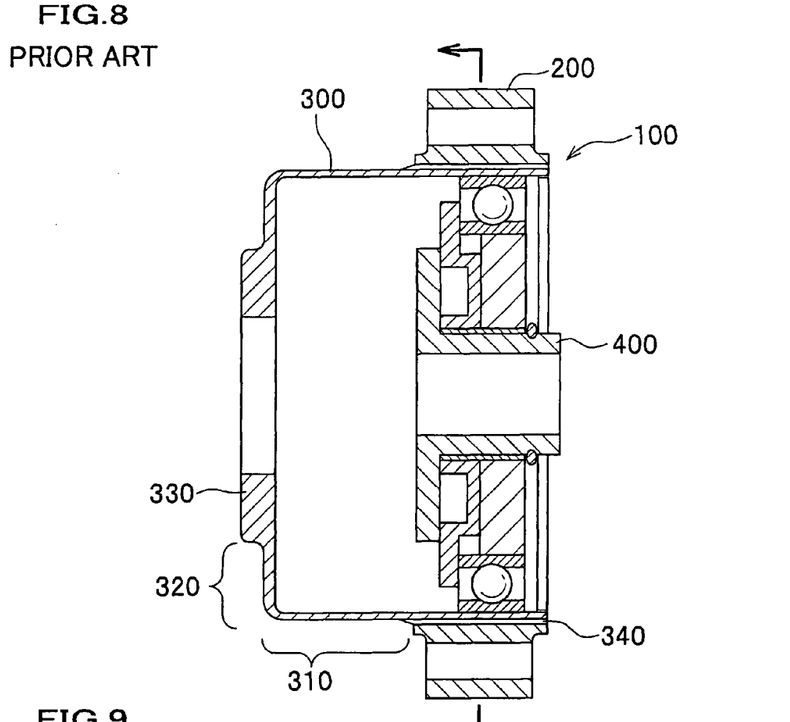
FIG. 8 is a sectional view of a conventional harmonic gear drive.
Figure 9:
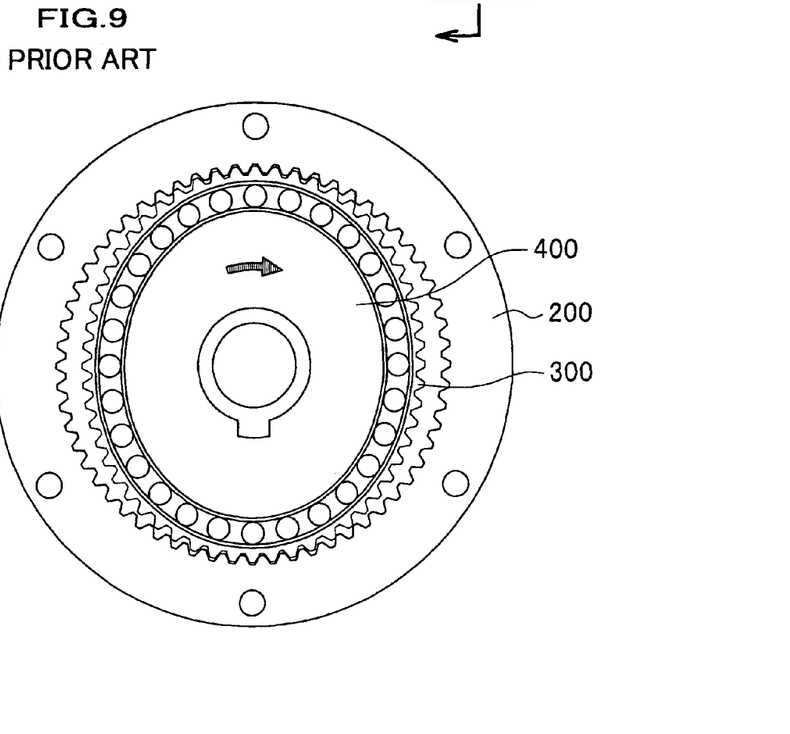
FIG. 9 is a side view of the conventional harmonic gear drive.

As seen in FIGS. 8 and 9, the harmonic gear drive 100 disclosed in the above Patent reference 1 comprises a rigid circular outer spline 200 with internal teeth, a flexspline 300 positioned inside the circular spline 200 and including external teeth, and an elliptical-shaped wave generator 400 fitted into the flexspline 300 through a bearing. The flexspline 300 includes a cylindrical portion 310, an annular diaphragm portion 320 continuously extending from the proximal side of the cylindrical portion 310, a boss (attachment portion) 330 formed in the center of and integrally with the diaphragm portion 320, and external teeth 340 formed on the outer peripheral surface of an open end portion which is positioned at the distal end of the cylindrical portion 310.

When the wave generator 400 is rotated by the rotation of the motor rotation shaft of the drive source, the flexspline 300 undergoes elastic deformation together with the outer race of the bearing which allows elastic deformation, so that the meshing points between the external teeth 340 of the flexspline 300 and the internal teeth of the rigid circular outer spline 200 displace in the circumferential direction. In general, since the rigid circular outer spline 200 is fixed to a stationary member, a rotation force is output from the boss (attachment portion) 330 of the flexspline 300 while the speed is greatly reduced in accordance with the difference of the number of teeth between the external teeth and the internal teeth.

In the flexspline 300, the cylindrical portion 310 which allows elastic deformation and the annular diaphragm portion 320 are joined together via a bent portion extending from the proximal end of the cylindrical portion 310 in the direction radially and inward toward the center of the boss 330. The flexspline 300 includes the annular boss (attachment portion) 330 integral with and positioned at the inner periphery of the diaphragm portion 320, and the external teeth 340 formed on the outer peripheral surface of the open end portion which is positioned at the distal end of the cylindrical portion 310.

This conventional harmonic gear drive 100 is light-weighted and has no backlash when compared with other reduction gear drives such as an involute planetary gear drive, and a cycloid planetary gear drive, and therefore it is suitable for applications where high positional accuracy is required.

For applications to products such as a robot where silence is required, there is a demand on the harmonic gear drive 100 disclosed in Patent reference 1 to reduce noise. However, the harmonic gear drive 100 has a structure which indispensably causes noise.

To be more specific, the harmonic gear drive 100 does not allow clearance between the flexspline 300 and the wave generator 400 in terms of its structure, and therefore the wave generator is lightly press-fitted into the flexspline 300 allowing the flexspline to be deformed into an elliptical shape.

Figure 10A:
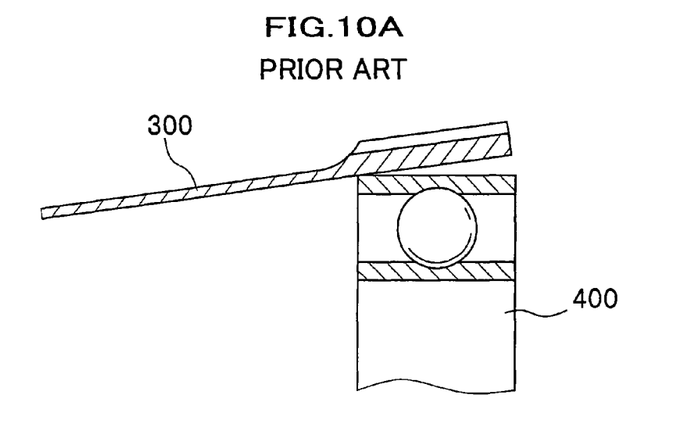
FIGS. 10A through 10C are schematic views illustrating a change of the state at the contact part between the flexspline and the wave generator of the conventional harmonic gear drive.
Figure 10B:
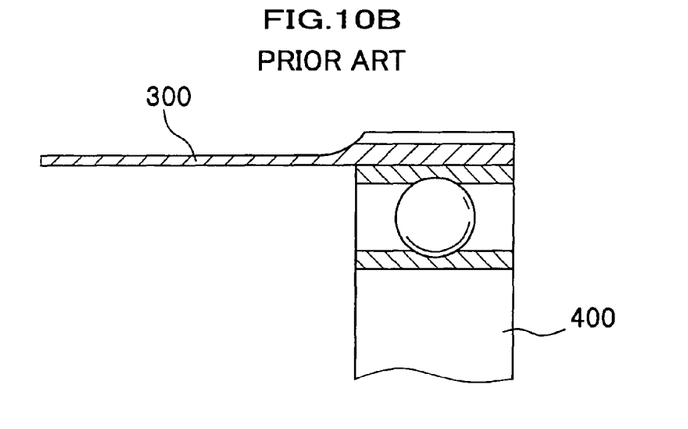
Figure 10C:
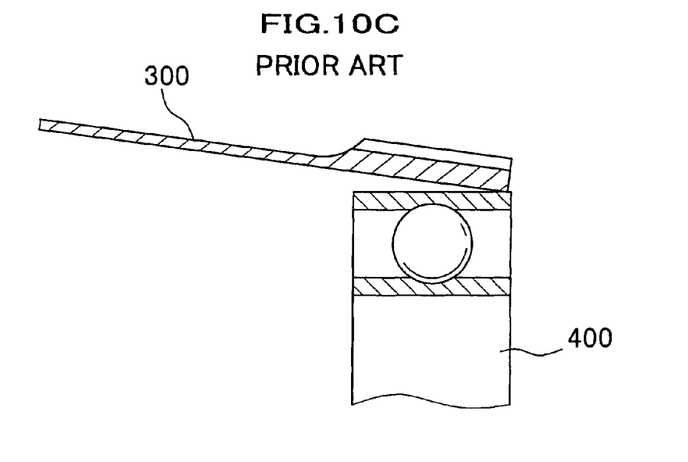

However, since the outer peripheral surface of the wave generator 400 is elliptical, the inner peripheral surface of the flexspline 300 changes its deformed amount at each point by the rotation of the wave generator 400. Therefore, each of the contact parts between the flexspline 300 and the wave generator 400 does not provide a complete surface contact, and as shown in FIGS. 10A to 10C, the state of each contact part changes during one rotation of the wave generator 400. During this time, slippage occurs at the contact part, so that sliding contact noise due to metallic materials of the flexspline 300 and the wave generator 400 occurs in accordance with the rotational frequency upon high-speed rotation of the wave generator 400.

If the harmonic gear drive 100 is disassembled after use, irrespective of the used time thereof, marks of slippage can be found at the contact parts between the flexspline 300 and the wave generator 400. Further, in the case of the harmonic gear drive 100 which is used for an extended period of time, a fretting corrosion may occur due to this slippage, which leads to a decrease in the service life of the product.

In view of the above, the present invention seeks to provide a harmonic gear drive which can restrict a noise due to slippage as well as a decrease in the service life of the product.

SUMMARY OF THE INVENTION

According to a first aspect of the present invention, there is provided a harmonic gear drive comprising: a flexspline and a rigid spline which are meshed with each other; and a wave generator which deforms the flexspline to displace meshing points between the flexspline and the rigid spline. The length of each contact part between the flexspline and the wave generator always becomes shorter as viewed in a sectional plane containing a rotation axis of the wave generator than the width of the wave generator.

With this construction of the harmonic gear drive, the contact area between the flexspline and the wave generator can be decreased. Therefore, it is possible to reduce a noise due to slippage between the flexspline and the wave generator, and thus to prevent a decrease in the service life of the product due to the slippage.

According to a second aspect of the present invention, there is provided a harmonic gear drive comprising: a flexspline and a rigid spline which are meshed with each other; and a wave generator which deforms the flexspline to displace meshing points between the flexspline and the rigid spline. At least one of surfaces of the flexspline and the wave generator as contact parts is formed to have a protrusion in a sectional position containing a rotation axis of the wave generator.

With this construction of the harmonic gear drive, the contact area between the flexspline and the wave generator can be decreased. Therefore, it is possible to reduce slippage between the flexspline and the wave generator as well as a noise due to this slippage, and thus to prevent a decrease in the service life of the product due to the slippage.

Preferably, at least one of the surfaces of the flexspline and the wave generator as contact parts is formed to have an arcuate profile in the sectional position containing the rotation axis of the wave generator.

With this construction of the harmonic gear drive, a displacement amount of the contact parts between the flexspline and the wave generator can be reduced along the rotation axis of the wave generator. Therefore, it is possible to reliably reduce slippage between the flexspline and the wave generator as well as a noise due to this slippage, and thus to reliably prevent a decrease in the service life of the product due to the slippage.

In the aforementioned harmonic gear drive, the flexspline may be an external gear whereas the rigid spline may be an internal gear, and the wave generator may be elliptical-shaped. Further, the flexspline may include a cylindrical portion, a teeth portion provided on the cylindrical portion and having external teeth, and a diaphragm portion continuously extending from the cylindrical portion. Furthermore, the contact part of the wave generator may be formed to have an arcuate profile in the sectional position containing the rotation axis of the wave generator, and a radius of curvature R for the contact part of the wave generator is set to satisfy the following formulae (1) and (2);

$$0 < R \leq B/(2 \cdot \sin \theta) \quad (1)$$

$$\theta = a \cdot \tan\{(a-d)/H\} \quad (2)$$

where B is a width of the wave generator in a sectional plane containing the rotation axis of the wave generator, a is a half (½) length of a major axis of the wave generator, d is a diameter of the flexspline when the flexspline provides a complete round, and H is a length from the diaphragm portion to the teeth portion.

With this construction of the harmonic gear drive, a displacement amount of the contact parts between the flexspline and the wave generator can be reduced in a more reliable manner along the rotation axis of the wave generator. Therefore, it is possible to more reliably reduce slippage between the flexspline and the wave generator as well as a noise due to this slippage, and thus to more reliably prevent a decrease in the service life of the product due to the slippage.

According to a third aspect of the present invention, there is provided a harmonic gear drive comprising: a flexspline and a rigid spline which are meshed with each other; a wave generator which deforms the flexspline to displace meshing points between the flexspline and the rigid spline; a first recess formed in a peripheral surface of the flexspline opposite to the wave generator; a second recess formed in a peripheral surface of the wave generator opposite to the flexspline; and rolling elements rotatably supported between the first recess and the second recess. At least one of the first recess and the second recess is a groove extending along a periphery of the flexspline or the wave generator, and the wave generator deforms the flexspline through the roller elements.

With this construction of the harmonic gear drive, providing rolling elements allows the contact area of the part where slippage may occur to be decreased. Therefore, it is possible to reduce slippage between the flexspline and the wave generator as well as a noise due to this slippage, and thus to prevent a decrease in the service life of the product due to the slippage.

Further, when compared with the conventional harmonic gear drive, since the inner race and the outer race of the bearing are omitted, it is possible to provide a small-sized harmonic gear drive.

Other features and advantages of the present invention will be apparent from the following description taken in conjunction with the accompanying drawings.

BRIEF DESCRIPTION OF THE DRAWINGS

Other objects and aspects of the present invention will become more apparent by describing in detail illustrative, non-limiting embodiments thereof with reference to the accompanying drawings, in which.

DESCRIPTION OF THE PREFERRED EMBODIMENTS

Preferred embodiments of the present invention will be described with reference to the accompanying drawings. Like reference characters designate corresponding parts in the drawings, and detailed description thereof will be omitted. Further, in the harmonic gear drive according to respective embodiments, detailed description for the parts similar to those of the conventional harmonic gear drive, i.e., flexspline, will be omitted.

First Embodiment

A harmonic gear drive according to the first embodiment will be described below.

Figure 1:
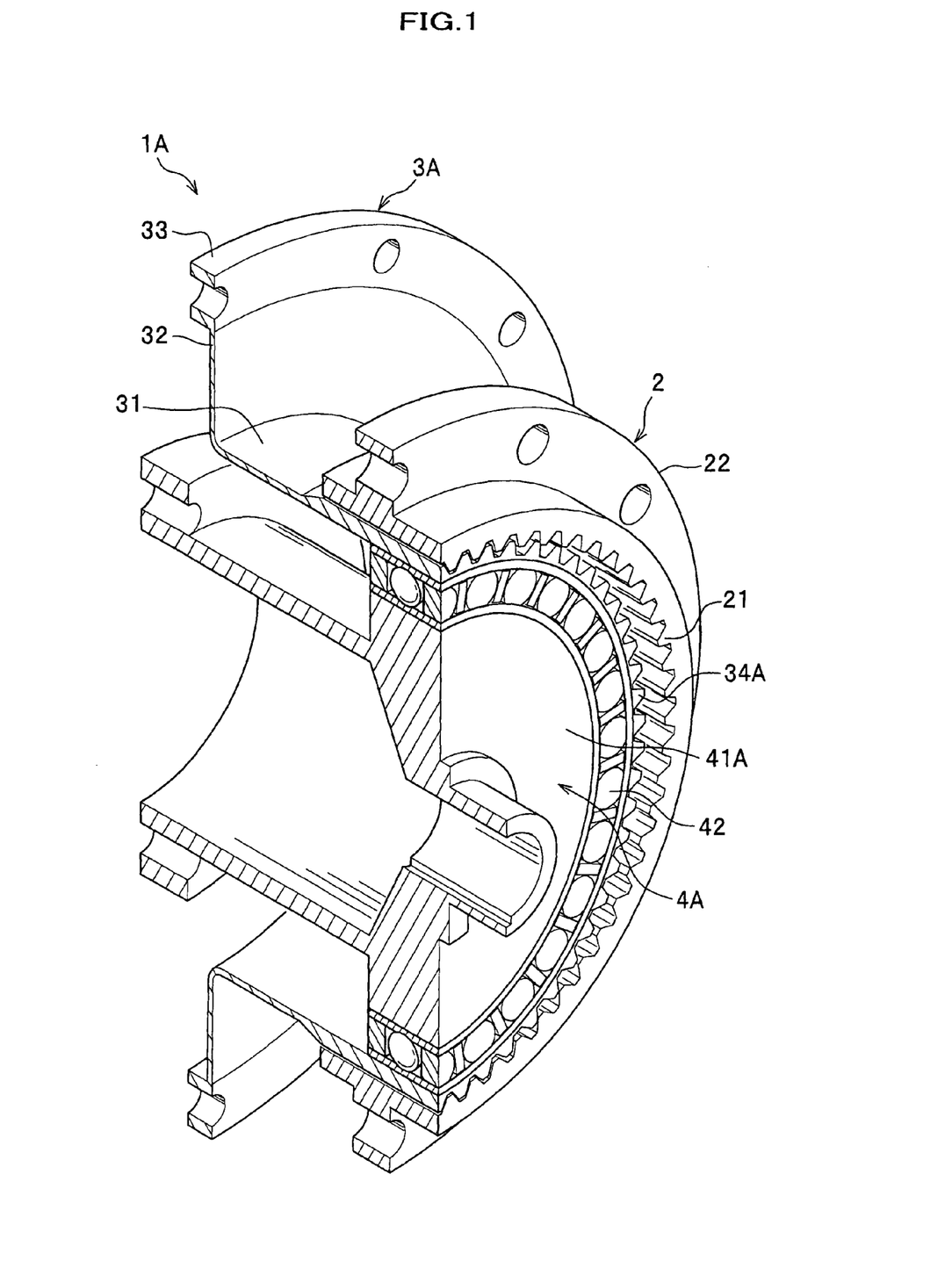
FIG. 1 is a partly sectional perspective view of a harmonic gear drive according to one embodiment of the present invention.

As shown in FIG. 1, a harmonic gear drive 1A mainly consists of a rigid circular outer spline 2, a flexible circular inner spline which allows elastic deformation (i.e., flexspline) 3A, and a wave generator 4A.

The rigid circular outer spline 2 includes internal teeth (teeth portion) 21 provided along the inner periphery of the circular spline 2, and a rigid gear attachment portion 22 for fixing the outer peripheral portion of the rigid circular outer spline 2 to a stationary member (not shown).

The flexspline 3A includes an attachment portion 33 which is joined to a power output member (not shown), and external teeth (teeth portion) 34A meshing with the internal teeth 21 of the rigid circular outer spline 2.

The attachment portion 33 is provided at one end of the flexspline 3A, and the external teeth 34A are provided at the other end of the flexspline 3A. The flexspline 3A is provided with a thin-walled flexible portion which is formed into a thin-wall connecting the attachment portion 33 and the external teeth 34.

As seen in FIG. 1, the harmonic gear drive 1A is constructed such that the inner teeth 21 of the rigid circular outer spline 2 and the external teeth 34A of the flexspline 3A are meshed with each other. The wave generator 4A includes an elliptical-shaped cam portion 41A which forces the external teeth 34A of the flexspline 3A into a non-circular elliptical form, thus causing meshing of the external teeth 34A with the internal teeth 21 of the rigid circular outer spline 2 across the major axis of the ellipse, and a bearing 42 which is fitted onto the cam portion 41A.

As seen in FIG. 1, the thin-walled flexible portion of the flexspline 3A includes a cylindrical portion 31 in the shape of a cylinder extending in the axial direction of the flexspline 3A, and a diaphragm portion 32 radially and continuously extending from the proximal end of the cylindrical portion 31.

The attachment portion 33 of the flexspline 3A continuously extends further from the diaphragm portion 32 in the radially external or internal direction and is formed into an annular form. In this preferred embodiment, as seen in the drawings, the attachment portion 33 is explained as an annular attachment portion extending in the radially external direction of the diaphragm portion 32.

The entire body of the flexspline 3A may be made of a flexible material. However, at least the thin-walled flexible portion including the cylindrical portion 31 and the diaphragm portion 32 is made of a flexible material and is formed to be thin-walled, so as to undergo elastic deformation. Meanwhile, the annular attachment portion 33 is thick-walled and has a plurality of attachment holes for the insertion of bolts. The external teeth 34A of the flexspline 3A are also formed to undergo elastic deformation.

At the teeth portion formed on the distal end of the cylindrical portion 31 along the outer peripheral surface of the open end portion of the flexspline 3A are formed external teeth 34A which extend in the radially external direction. In order to form the external teeth 34, the end portion of the flexspline 3A is slightly thicker than the main body of the cylindrical portion 31. The diaphragm portion 32 is joined to the cylindrical portion 31 via a bent portion 35 extending from the proximal end of the cylindrical portion 31. Therefore, the diaphragm portion 32 continuously extends in the radial direction from the proximal end of the cylindrical portion 31. Further, the attachment portion 33 continuously extends in the radial direction from the diaphragm portion 32.

The rigid circular outer spline 2 is made of a rigid material, and at the teeth portion provided along the inner peripheral surface of the circular spline 2 are formed internal teeth 21 which extend in the radially internal direction. The internal teeth 21 of the rigid circular outer spline 2 partly mesh with the external teeth 34A of the flexspline 3A by means of a flexible bearing (ball bearing) 42 fitted onto the elliptical-shaped cam portion 41A of the wave generator 4A.

The wave generator 4A includes the cam portion 41A and the bearing 42, and is fixed to the rotation shaft of a motor (not shown) or the like. The cam portion 41A is formed into an elliptical form such that the outer peripheral surface of the cam portion 41A provides a cam action by the rotation of the motor or the like.

The cam portion 41A functions to deform the external teeth 34A of the flexspline 3A in the radial direction and to force them into meshing engagement partly with the inner teeth 21 of the rigid circular outer spline 2.

Figure 2:
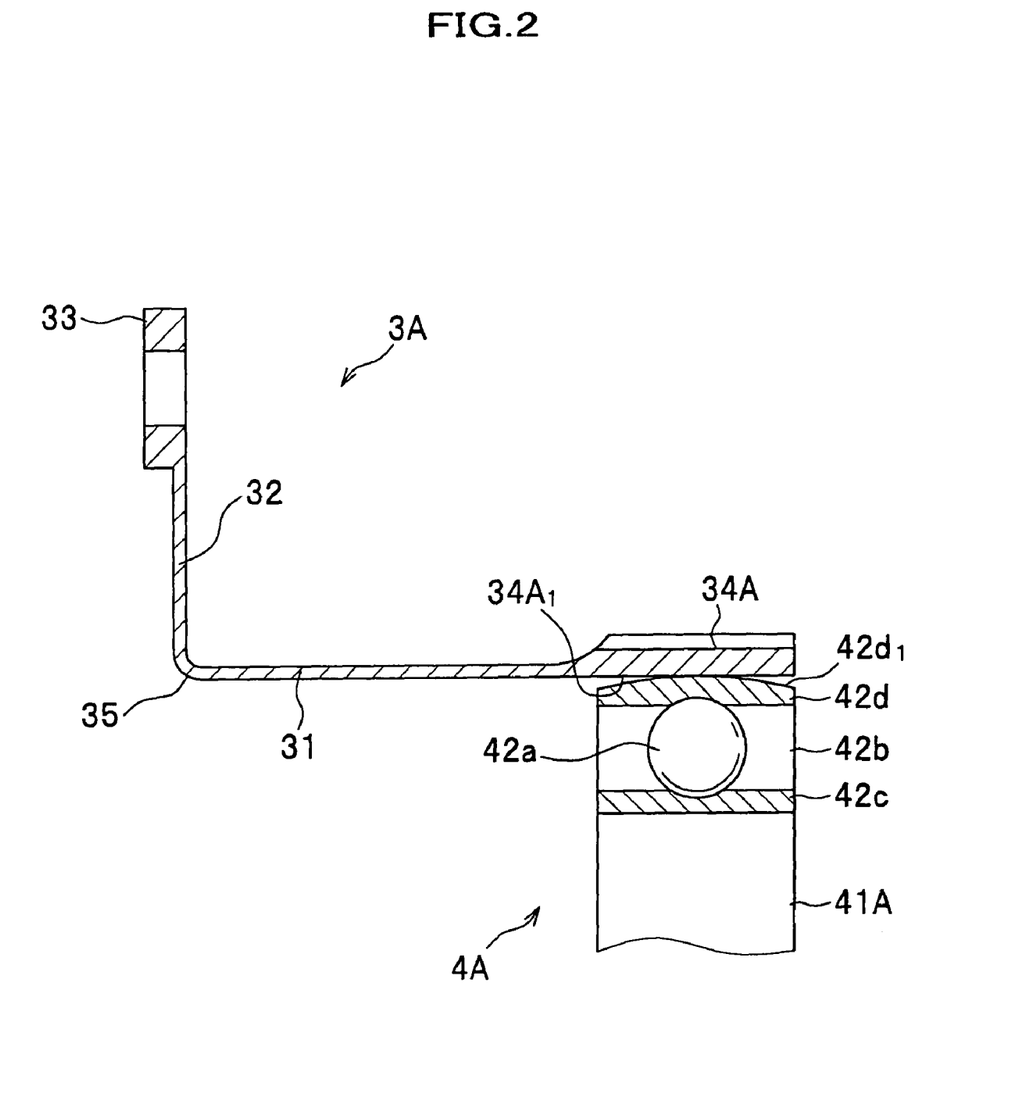
FIG. 2 is a schematic view illustrating main parts of the flexspline and the wave generator of the harmonic gear drive.

As shown in FIG. 2, the flexspline 3A is constructed such that the thin-walled flexible portion is integrally formed from the cylindrical portion 31, the bent portion 35, and the diaphragm portion 32.

The bearing 42 includes rolling elements 42a retained by a cage 42b, an inner race 42c and an outer race 42d. The rolling elements 42a are retained by the cage 42b whose center is aligned with the center of the cam portion 41A. The inner race 42c of the bearing 42 is fixed to the outer periphery of the cam portion 41A of the wave generator 4A, and the outer race 42d is fitted into the reverse surface of the teeth portion (external teeth 34A) provided at the open end portion which is positioned at the distal end of the cylindrical portion 31 of the flexspline 3A. The outer race 42d of the bearing 42 is elastically deformable. The outer peripheral surface $42d_1$ of the outer race 42d is formed to have a protrusion that is preferably of an arcuate profile, in the section containing the rotation axis of the wave generator 4A. Details of the outer peripheral surface $42d_1$ will be described later.

Operation of Harmonic Gear Drive

Operation of the harmonic gear drive 1A will be described below.

When the wave generator 4A is driven by the motor or the like, the cam portion 41A of the wave generator 4A is rotated through the input shaft (not shown). By the rotation of the cam portion 41A, the cylindrical portion 31 of the flexspline 3A is deflected into an elliptical form and continuously deformed through the outer race 42d of the bearing 42 which is elastically deformable by the cam portion 41A. During this time, the meshing points of the external teeth 34A of the flexspline 3A and the internal teeth 21 of the rigid circular outer spline 2 are sequentially displaced in the circumferential direction.

The number of teeth is different between the rigid circular outer spline 2 and the flexspline 3A. With respect to the meshing points of the internal teeth 21 of the rigid circular outer spline 2 and the external teeth 34A of the flexspline 3A, a relative rotation occurs between the circular spline 2 and the flexspline 3A in accordance with the different number of teeth, that is four in this preferred embodiment. Since the rigid circular outer spline 2 is fixed not to allow the relative rotation, a rotation force is transmitted and output from the flexspline 3A to the output side (not shown) while the speed is greatly reduced in accordance with the different number of teeth.

According to the operation of the harmonic gear drive 1A, the cylindrical portion 31 of the flexspline 3A is elastically deformed through the elastically deformable outer race 42d of the bearing 42. Therefore, a pre-load is generated such that the external teeth 34A of the flexspline 3A are urged toward the inner teeth 21 of the rigid circular outer spline 2, which can absorb play between the external teeth 34A and the internal teeth 21 as well as decrease backlash.

Figure 3:
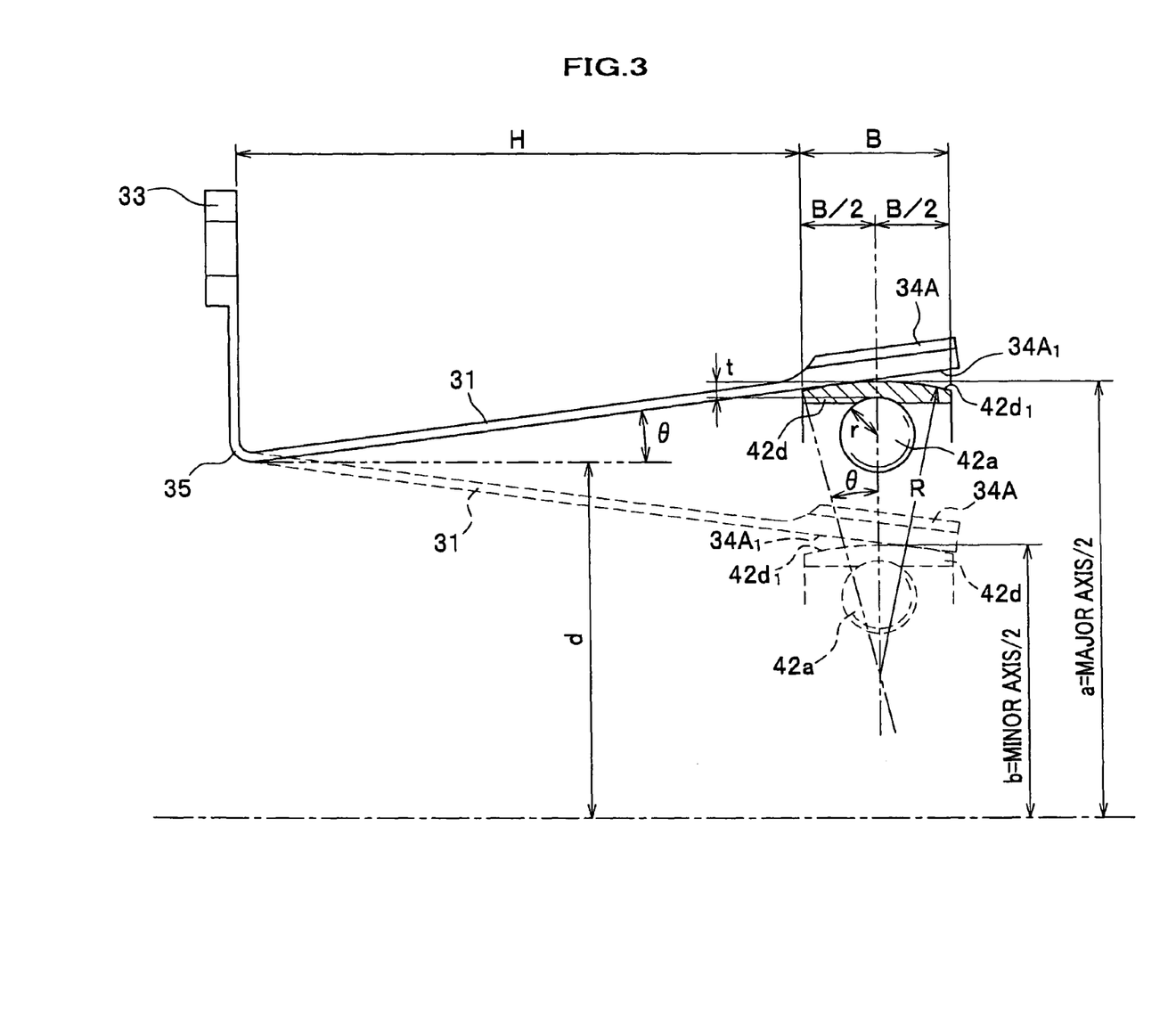
FIG. 3 is a schematic view illustrating a change of the state at the contact part between the flexspline and the wave generator of the harmonic gear drive.

As described previously, upon driving the harmonic gear drive 1A, the state of the contact part between the flexspline 3A and the wave generator 4A changes as shown in FIGS. 2 and 3. As best seen in FIGS. 2 and 3, the surface of the wave generator 4A partly contacts with the flexspline 3A at the outer peripheral surface $42d_1$ of the outer race $42d$, which is to be the contact part with the flexspline 3A. This contact part is formed to have an arcuate profile in the sectional plane containing the rotation axis of the wave generator 4A.

Meanwhile, the surface of the flexspline 3A partly contacts with the wave generator 4A at the inner peripheral surface $34A_1$ of the teeth portion, which is to be the contact part with the wave generator 4A. This contact part is formed as a straight line in the sectional plane containing the rotation axis of the wave generator 4A.

The outer peripheral surface $42d_1$ of the outer race $42d$ comes into contact with the inner peripheral surface $34A_1$ of the flexspline 3A, thereby deflecting the external teeth (teeth portion) 34A, the cylindrical portion 31, and the diaphragm portion 32.

To be more specific, as seen in FIGS. 2 and 3, the length of the contact part between the flexspline 3A and the wave generator 4A always becomes shorter than the width B of the wave generator 4A. Therefore, the harmonic gear drive 1A according to the first embodiment of the present invention can reduce slippage between the flexspline 3A and the wave generator 4A as well as a noise due to this slippage, and thus it is possible to prevent a decrease in the service life of the product due to the slippage.

Further, the radius of curvature R for the outer peripheral surface $42d_1$ of the outer race $42d$ is set to satisfy the following formulae (1) and (2);

$$0 < R \leq B/(2 \cdot \sin \theta) \quad (1)$$

$$\theta = a \cdot \tan\{(a-d)/H\} \quad (2)$$

where B is the width of the wave generator 4A in the sectional plane containing the rotation axis of the wave generator 4A, a is a half (½) length of the major axis of the wave generator 4A, d is the diameter of the flexspline 3A when the flexspline 3A provides a complete round, and H is the length from the diaphragm portion 32 to the teeth portion (external teeth 34A). In FIG. 3, b is a half (½) length of the minor axis of the wave generator 4A.

With this construction of the harmonic gear drive 1A, a displacement amount of the contact parts between the flexspline 3A and the wave generator 4A can be reduced in a more reliable manner along the rotation axis of the wave generator 4A. Therefore, it is possible to more reliably reduce slippage between the flexspline 3A and the wave generator 4A as well as a noise due to this slippage, and thus to more reliably prevent a decrease in the service life of the product due to the slippage.

In consideration of material strength, the radius of curvature R for the outer peripheral surface $42d_1$ is preferably set to satisfy the following formula (3);

$$r + t \leq R \leq B/(2 \cdot \sin \theta) \quad (3)$$

where r is the radius of the rolling element $42a$, t is the minimum thickness for retaining the strength at a part where the outer race $42d$ contacts with the rolling element $42a$.

t takes a different value in accordance with material, size, use conditions, etc. of the bearing 42. The value of t can be obtained in advance by experiments or calculation.

In general, it is preferable for the harmonic gear drive 1A to be designed to satisfy the following formula (4);

$$a - d = d - b \quad (4)$$

If the formula (4) does not hold true, that is (a−d≠d−b), it is preferable that θ is set by the following formulae (5), (6) and (7);

$$\theta = a \cdot \tan[\{MAX(\Delta ra, \Delta rb)\}/H] \quad (5)$$

$$\Delta ra = a - d \quad (6)$$

$$\Delta rb = d - b \quad (7)$$

where MAX (Δra, Δrb) is the maximum value among values of Δra and Δrb.

Second Embodiment

A harmonic gear drive according to a second embodiment of the present invention will be described below, particularly with consideration given to differences from the harmonic gear drive 1A according to the first embodiment.

Figure 4:
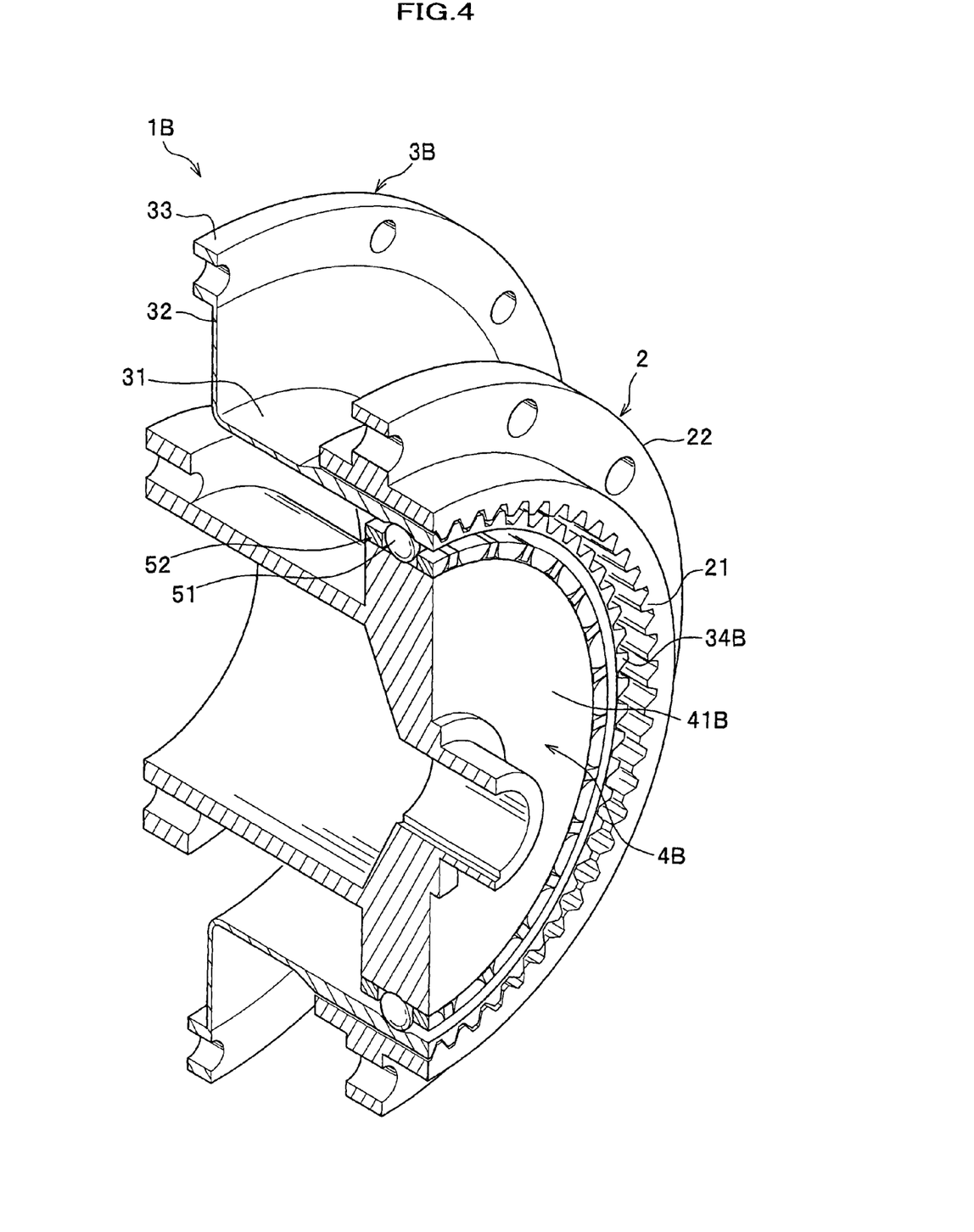
FIG. 4 is a partly sectional view of a harmonic gear drive according to second embodiment of the present invention.

As shown in FIG. 4, a harmonic gear drive 1B according to the second embodiment includes a flexspline 3B and a wave generator 4B. Further, the harmonic gear drive 1B includes rolling elements (balls) 51 rotatably retained by a cage 52.

The flexspline 3B is provided with external teeth (teeth portion) 34B. A first recess $34B_1$ is formed in the inner peripheral surface of the teeth portion of the flexspline 3B. The first recess $34B_1$ is formed as a loop-shaped groove extending along the inner periphery of the teeth portion.

The wave generator 4B includes a cam portion 41B. It should be noted that the wave generator 4B is not furnished with a bearing. A second recess $41B_1$ is formed in the outer peripheral surface of the cam portion 41B. The second recess $41B_1$ is formed as a loop-shaped groove extending along the outer periphery of the cam portion 41B.

Rolling elements 51 and the cage 52 are substantially the same as the rolling elements $42a$ and the cage $42b$ of the harmonic gear drive 1A. The rolling elements 51 are rotatably supported between the first recess $34B_1$ and the second recess $41B_1$.

To be more specific, the harmonic gear drive 1B according to the second embodiment is constructed to have a structure similar to the harmonic gear drive 1A according to the first embodiment but without the inner race $42c$ and the outer race $42d$.

Figure 5:
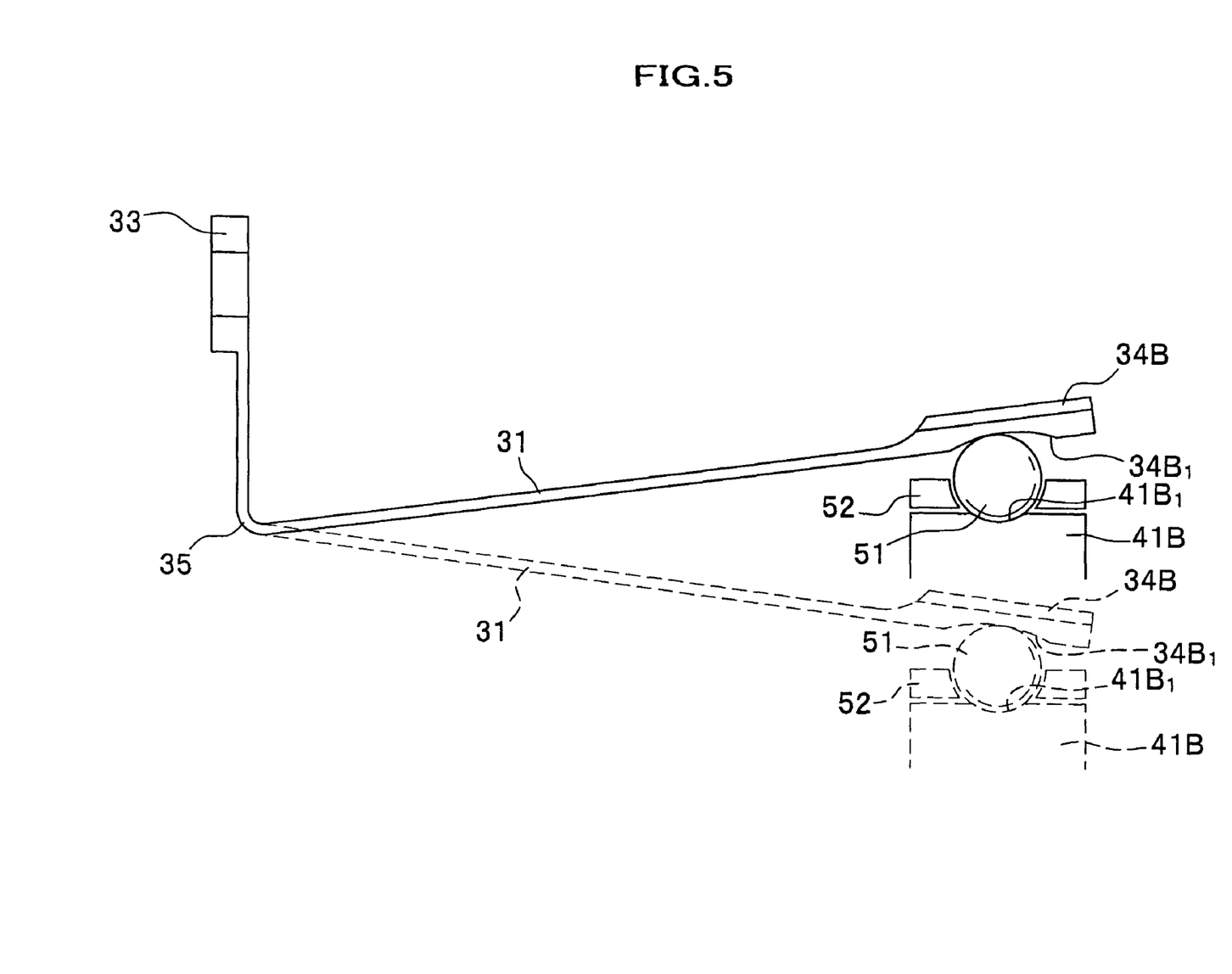
FIG. 5 is a schematic view illustrating a change of the state at the contact part between the flexspline and the wave generator of the harmonic gear drive as shown in FIG. 4.

Further, as shown in FIG. 5, the shape of the groove of the second recess $41B_1$ is formed along the rolling elements 51, whereas the shape of the groove of the first recess $34B_1$ is set to allow a relative displacement of the rolling elements 51 in the right and left directions of FIG. 5. This configuration of the first and second recesses $34B_1$, $41B_1$ advantageously absorbs a deviation of the contact position between the first recess $34B_1$ and each of the rolling elements 51, which is derived from the deflection of the flexspline 3B.

Furthermore, the height of the cage 52 is set lower than the height of the cage $42b$. This can prevent the cage 52 from interfering with the inner peripheral surface of the teeth portion (external teeth 34B).

According to the harmonic gear drive 1B, providing the rolling elements 51 allows the contact area of the part where slippage may occur to be decreased. Therefore, it is possible to reduce slippage that occurs by driving the harmonic gear drive 1B as well as to reduce a noise due to this slippage. As a result, it is possible to prevent a decrease in the service life of the product due to the slippage.

Further, since the inner race and the outer race of the bearing are omitted, it is possible to realize a small-sized harmonic gear drive.

Although the present invention has been described with reference to some specific embodiments, it is to be understood that the present invention is not limited to these specific embodiments and that various changes and modifications may be made without departing from the scope of the invention.

For example, in the first embodiment, at least one of the inner peripheral surface of the teeth portion of the flexspline 3A, which is to be the contact part with the wave generator 4A, and the outer peripheral surface $42d_1$ of the wave generator 4A may be formed to have a protrusion that is preferably of an arcuate profile, in the sectional plane containing the rotation axis of the wave generator 4A.

Figure 6:
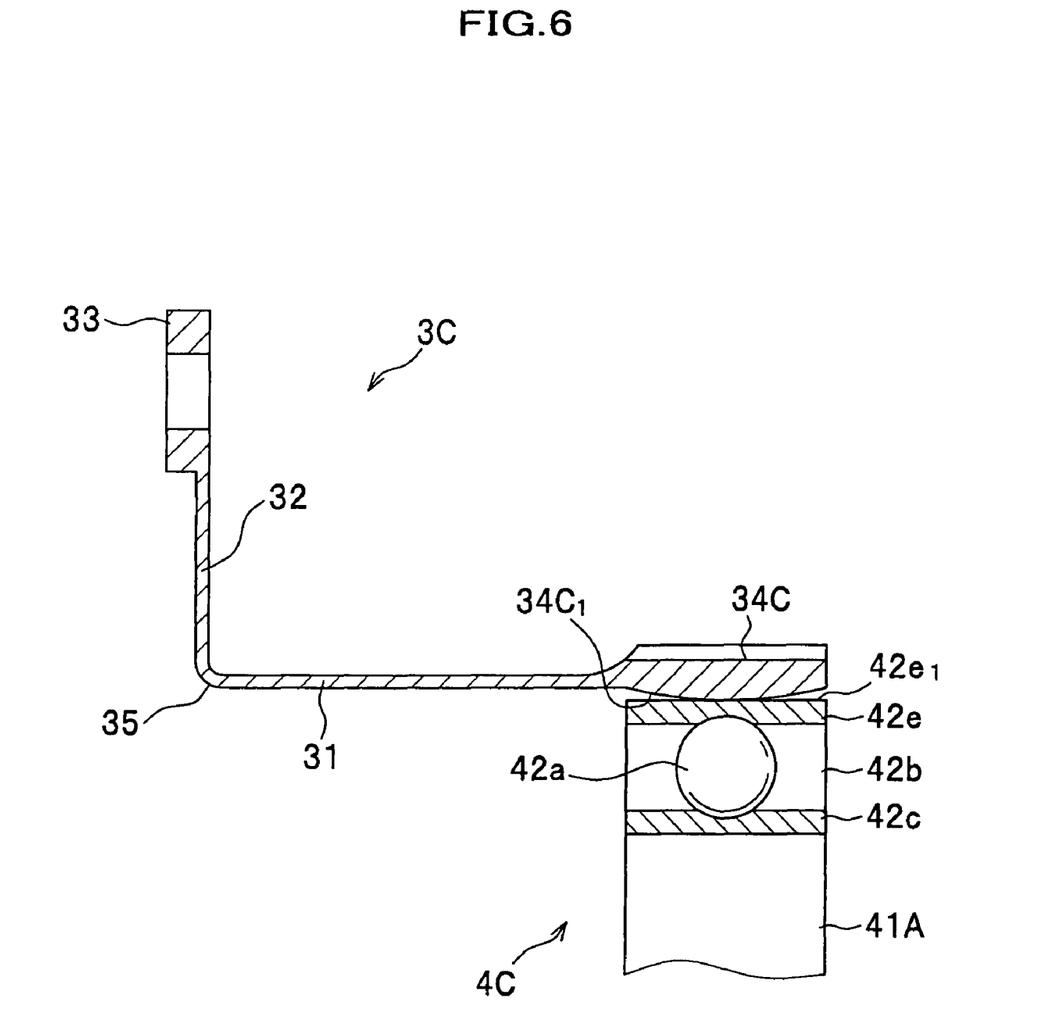
FIG. 6 is a schematic view illustrating main parts of the flexspline and the wave generator of the harmonic gear drive according to a modified embodiment.
Figure 7:
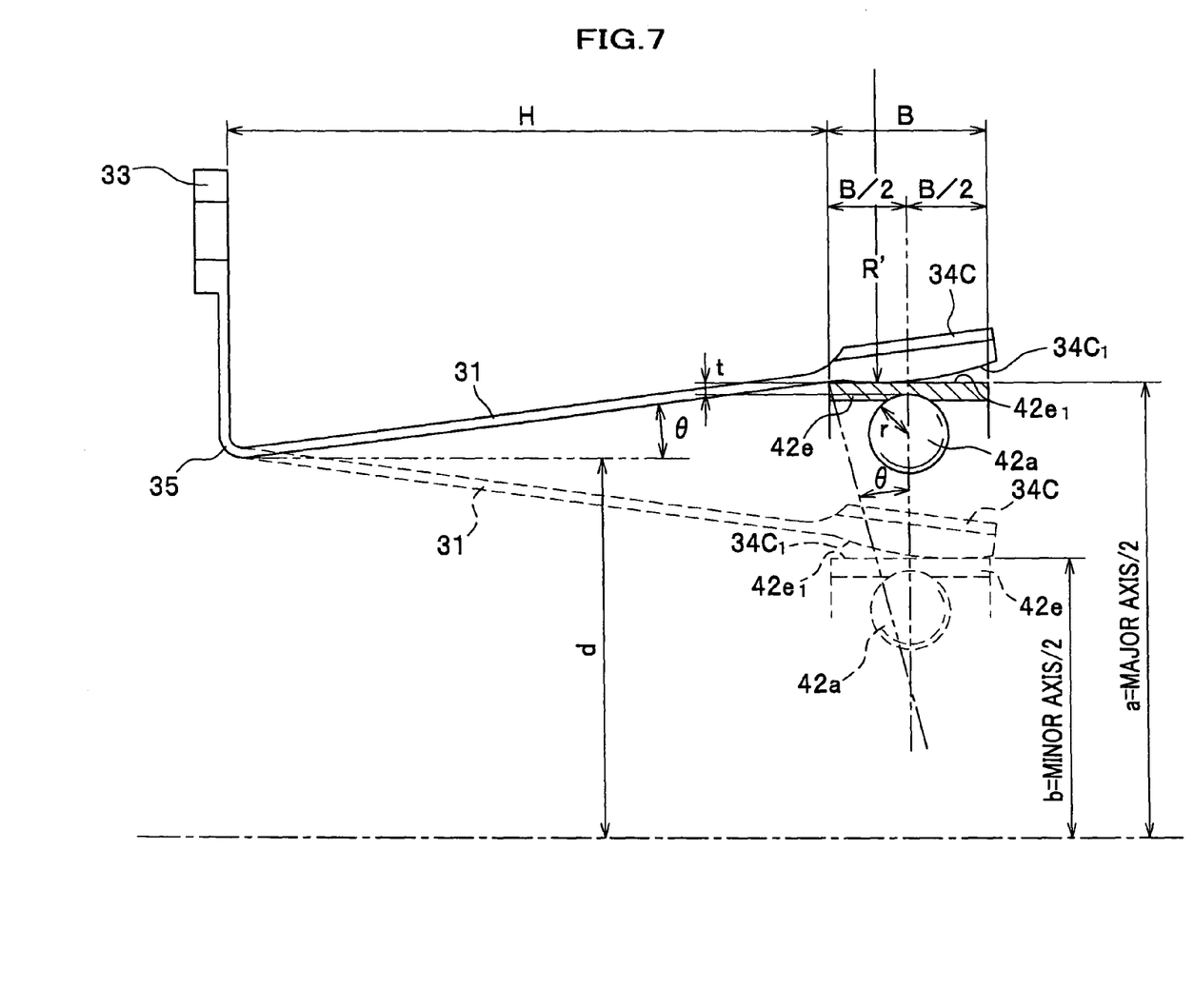
FIG. 7 is a schematic view illustrating a change of the state at the contact part between the flexspline and the wave generator of the harmonic gear drive according to the modified embodiment.

FIGS. 6 and 7 show a harmonic gear drive according to a modified embodiment. As shown in FIGS. 6 and 7, a flexspline 3C and a wave generator 4C are modifications of the flexspline 3A and the wave generator 4A of the harmonic gear drive 1A according to the first embodiment. The flexspline 3C and the wave generator 4C will be described below, particularly with consideration given to differences from the harmonic gear drive 1A according to the first embodiment.

In this modified embodiment, the inner peripheral surface $34C_1$ of the teeth portion of the flexspline 3C is formed to have an arcuate profile in the sectional plane containing the rotation axis of the wave generator 4C. The outer peripheral surface $42e_1$ of the outer race $42e$ is formed as a straight line in the sectional plane containing the rotation axis of the wave generator 4C.

Even in the flexspline 3C and the wave generator 4C, the radius of curvature R' for the inner peripheral surface $34C_1$ satisfies the same conditions of the radius of curvature R for the outer peripheral surface $42d_1$ according to the first embodiment.

Although the preferred embodiments of the present invention will be described with reference to an arrangement in which the rigid circular outer spline 2 has the inner teeth 21, the present invention is not limited to this specific arrangement. The rigid circular spline may have external teeth along its outer periphery. The flexspline 3A, 3B may have internal teeth along its inner periphery, instead of providing the external teeth along the outer periphery thereof. Further, the wave generator 4A, 4B may not be limited to the specific structure of these preferred embodiments, and in place of the elliptical-shaped cam portion, there may be provided a wave generator which mainly consists of an electromagnet and magnetic fluid.

What is claimed is:

1. A harmonic gear drive comprising:
a flexspline and a rigid spline which are meshed with each other; and
a wave generator which deforms the flexspline to displace meshing points between the flexspline and the rigid spline,
wherein the wave generator comprises a plurality of bearings,
wherein an inner peripheral surface of a teeth portion of the flexspline or an outer peripheral surface of the wave generator as contact parts is formed to have a protrusion,
wherein a length of each contact part between the flexspline and the wave generator always becomes shorter as viewed in a sectional plane containing a rotation axis of the wave generator than a width of the wave generator,
wherein the protrusion is formed to have an arcuate profile,
wherein the flexspline is an external gear whereas the rigid spline is an internal gear, and the wave generator is elliptical-shaped, wherein the flexspline includes a cylindrical portion, the teeth portion provided on the cylindrical portion, and having external teeth, and a diaphragm portion continuously extending from the cylindrical portion, and a radius of curvature R for the contact part of the wave generator is set to satisfy the following formulae (1) and (2);

$$0 < R < B/(2 \cdot \sin \theta) \quad (1)$$

$$\theta = a \cdot \tan\{(a-d)H\} \quad (2)$$

wherein B is a width of the wave generator in a sectional plane containing the rotation axis of the wave generator, a is a half length of a major axis of the wave generator, d is a diameter of the flexspline when the flexspline provides a complete round, and H is a length from the diaphragm portion to the teeth portion.

* * * * *